United States Patent
Iyer et al.

(10) Patent No.: US 11,102,099 B2
(45) Date of Patent: Aug. 24, 2021

(54) SYSTEMS AND METHODS FOR IN-LINE LOSS MEASUREMENT ON SD-WAN OVERLAY PATHS

(71) Applicant: Versa Networks, Inc., San Jose, CA (US)

(72) Inventors: Jayakrishnan V. Iyer, Morgan Hill, CA (US); Krishna Sankaran, Palo Alto, CA (US); Roopa Bayar, Cupertino, CA (US); Akshay Adhikari, San Jose, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 132 days.

(21) Appl. No.: 16/686,042

(22) Filed: Nov. 15, 2019

(65) Prior Publication Data

US 2021/0152450 A1    May 20, 2021

(51) Int. Cl.
  *H04L 12/26* (2006.01)
  *H04L 12/715* (2013.01)
  *H04L 12/24* (2006.01)

(52) U.S. Cl.
  CPC ...... *H04L 43/0829* (2013.01); *H04L 41/5019* (2013.01); *H04L 43/0852* (2013.01); *H04L 43/106* (2013.01); *H04L 43/12* (2013.01); *H04L 45/64* (2013.01)

(58) Field of Classification Search
  CPC ............. H04L 41/5019; H04L 43/0829; H04L 43/835; H04L 43/0841; H04L 43/0852; H04L 43/102; H04L 43/12; H04L 45/64
  See application file for complete search history.

(56) References Cited

U.S. PATENT DOCUMENTS

| | | | | |
|---|---|---|---|---|
| 7,643,426 B1 * | 1/2010 | Lee | ......................... | H04L 45/02 370/238 |
| 9,225,615 B2 * | 12/2015 | Seo | ...................... | H04L 41/5025 |
| 9,397,913 B1 * | 7/2016 | Nimmagadda | ...... | H04L 43/0835 |
| 9,787,559 B1 * | 10/2017 | Schroeder | ............... | H04L 43/12 |
| 2010/0008250 A1 * | 1/2010 | Nomura | .............. | H04L 43/0835 370/252 |
| 2011/0188380 A1 * | 8/2011 | Song | ................... | H04L 43/0829 370/241.1 |
| 2011/0255440 A1 * | 10/2011 | Cociglio | ................. | H04L 47/34 370/253 |
| 2016/0359698 A1 * | 12/2016 | Deen | ................... | H04L 41/0668 |

(Continued)

FOREIGN PATENT DOCUMENTS

EP    2456126 A1 *    5/2012   ......... H04L 43/0835

*Primary Examiner* — Aaron N Strange
(74) *Attorney, Agent, or Firm* — Loza & Loza, LLP

(57) ABSTRACT

An advancement over previous techniques using only certain out-of-band probe PDUs to determine loss. Packet loss statistics for a SD-WAN overlay path can be calculated for every packet transmitted by one endpoint and every packet received at the other endpoint. The roles of the positions of circular buffers can be periodically rotated from active to pre-stable to stable to post-stable. Counters in the active role can be incremented whenever a packet is transmitted. A position identifier can indicate which counter to increment when the packet is received. Counters in positions that are stable can be used to produce loss statistics for the SD-WAN overlay path.

20 Claims, 9 Drawing Sheets

(56) References Cited

U.S. PATENT DOCUMENTS

| | | |
|---|---|---|
| 2017/0111251 A1* | 4/2017 | Holness .............. H04L 43/0841 |
| 2018/0123927 A1* | 5/2018 | Chang .................... H04L 69/22 |
| 2020/0220805 A1* | 7/2020 | Dhanabalan ............ H04L 69/14 |
| 2021/0092047 A1* | 3/2021 | Dutta ...................... H04L 45/72 |

* cited by examiner

Delta = (Current Counter Value) - (Previous Counter Value)

Fig. 10

Forward Loss - Absolute Loss

Forward Loss = (Foward Packets Transmited) - (Forward Packets Received)

Fig. 11

Forward Loss Ratio - Loss Ratio $$\text{Forward Loss} = \frac{(\text{Foward Packets Transmited}) - (\text{Forward Packets Received})}{(\text{Foward Packets Transmited})} * 100$$

Fig. 12

SYSTEMS AND METHODS FOR IN-LINE LOSS MEASUREMENT ON SD-WAN OVERLAY PATHS

TECHNICAL FIELD

The embodiments herein relate to computer networks, software defined wide area networks (SD-WANs), network monitoring, service level agreements, and, more particularly, to measuring packet loss within an SD-WAN.

BACKGROUND

Historically, organizations used dedicated and expensive lines to provide connectivity between distant branches. A local area network (LAN) of one branch was connected to the LAN of another branch using a dedicated line specifically leased for the purpose. With the rise of internet service providers (ISPs) providing relatively inexpensive connections to the internet, the organizations transitioned to wide area networks (WANs) by routing their traffic over the internet. While less expensive, routing over the internet introduces quality of service problems such as sporadic packet loss, increased packet delay, increased jitter (inconsistent delivery times), and out of order delivery. An additional problem was the increased operational complexity involved in maintaining the WAN. Further problems with inexpensive ISP provided high bandwidth links relate to security such as traffic snooping and man in the middle (MITM) attacks. Software defined WANs (SD-WANs) simplify the operation and management of WANs by decoupling the networking hardware from its control mechanism. This decoupling results in a control plane and a data plane.

While SD-WANs simplify WAN operation and management, the underlying quality of service problems of WANs remain. It is the nature of the internet that packets can take different routes, that the available bandwidth can change unpredictably, and that seemingly random sections of internet infrastructure go down.

BRIEF SUMMARY

It is an aspect of the embodiments that a method for in-line loss measurement on an SD-WAN overlay path can be implemented. By establishing an SD-WAN overlay path between a first endpoint and a second endpoint, network traffic can be passed between the endpoints using the SD-WAN overlay path. To provide clarity in discussing network operation, the traffic passing from the first endpoint to the second endpoint is called forward network traffic. Network traffic passing from the second endpoint to the first endpoint is called reverse network traffic. The forward network traffic has a plurality of forward packets encapsulating a plurality of first LAN packets while the reverse network traffic has a plurality of reverse packets encapsulating a plurality of second LAN packets.

Another aspect of the embodiments is maintaining a plurality of circular buffers holding network traffic data. A different set of circular buffers can be used for each different SD-WAN overlay path. Additional endpoints can be connected using additional SD-WAN overlay paths. Two circular buffers, a forward transmit buffer and a forward receive buffer, can be used for the forward network traffic. Another two circular buffers, a reverse transmit buffer and a reverse receive buffer, can be used for the reverse network traffic. Each of the circular buffers should have at least four positions to ensure data integrity while rotating the roles of the positions. The roles can be active, pre-stable, stable, and stable. The plurality of circular buffers has a plurality of counters where each position of every circular buffer can have at least one counter.

Periodically rotating the roles to different positions is a further aspect of the embodiments. For a circular buffer having four positions, rotating the roles can be transitioning the position that is post-stable to active, transitioning the position that is stable to post-stable, transitioning the position that is pre-stable to stable, and transitioning the position that is active to pre-stable. All the roles should be transitioned at the same time to prevent data corruption. The roles can be rotated every two seconds, which works well for many networks because packet delay over the internet can average 50 ms for most sites. Some networks are faster and others are slower. As such and depending on network characteristics the roles may be rotated no more once per second and no less than once every ten seconds. The interval for rotating the roles can be pre-determined by exchanging information between SD-WAN peers. The SD-WAN peers can exchange the information using a protocol such as BGP (Border Gateway Protocol), or MP-BGP (Multiprotocol Border Gateway Protocol).

The forward transmit buffer has a position in the active role and the counter for that position can be called the active forward transmit counter. The active forward transmit counter can be incremented whenever one of the forward packets is transmitted from the first endpoint. The forward receive buffer has a position in the active role and the counter for that position can be called the active forward receive counter. The forward receive buffer has a position in the pre-stable role and the counter for that position be called the pre-stable forward receive counter. The active forward receive counter or the pre-stable forward receive counter can be incremented whenever one of the forward packets is received by the second endpoint. The reverse transmit buffer has a position in the active role and the counter for that position can be called the active reverse transmit counter. The active reverse transmit counter can be incremented whenever one of the reverse packets is transmitted from the second endpoint. The reverse receive buffer has a position in the active role and the counter for that position can be called the active reverse receive counter. The reverse receive buffer has a position in the pre-stable role and the counter for that position can be called the pre-stable reverse receive counter. The active reverse receive counter or the pre-stable reverse receive counter can be incremented whenever one of the reverse packets is received by the first endpoint.

The forward transmit buffer has a position in the stable role and the counter for that position can be called the stable forward transmit counter. The forward receive buffer has a position in the stable role and the counter for that position can be called the stable forward receive counter. Recalling that the forward packets are sent from the first endpoint to the second endpoint, the stable forward transmit counter and the stable forward receive counter would be equal if there is no packet loss along the SD-WAN overlay path and if the period for rotating the roles is greater than the delay in delivering the packets. Incrementing a counter can occur every time any packet is transmitted and another counter incremented every time any packet is received.

The forward loss can be determined by obtaining forward data, which includes forward receive data and forward transmit data. The forward transmit data can be obtained from the position of the forward transmit buffer that is stable. The forward receive data can be obtained from the position of the forward receive buffer that is stable. The forward transmit buffer can be maintained by the first endpoint and the forward receive buffer can be maintained by the second endpoint. At least part of the forward data, the forward transmit data, can be obtained from the first endpoint in response to a message sent to the first endpoint. At least part of the forward data, the forward receive data, can be obtained from the second endpoint in response to a message sent to the second endpoint. SLA-PDU (Service Level Agreement Protocol Data Unit) packets, MP-BGP packets, or BGP packets can carry the forward transmit data, the forward reverse data, and other data held in the circular buffers. The SLA-PDUs can conform with ITU Y.1731 or can be similar to those specified by ITU Y.1731.

Determining a forward loss of the SD-WAN overlay path can reveal a forward loss that can be the number of transmitted packets minus a number of received packets. The forward loss can be a ratio of packets lost to packets transmitted. The forward loss an absolute loss that can be the value of the stable forward transmit counter minus the value of the stable forward receive counter. A loss fraction can be the absolute loss divided by the value of the stable forward transmit counter. A loss ratio can be the loss fraction multiplied by 100. The value of the stable forward receive counter can be obtained from the forward receive data. The value of the stable forward transmit counter can be obtained from the forward transmit data. Determining the forward loss is one aspect of in-line loss measurement. Determining the packet loss in the other direction, the reverse loss, is another aspect of in-line loss measurement. A method for in-line loss measurement on an SD-WAN overlay path can include measuring the forward loss and the reverse loss.

It is another aspect of the embodiments that the packets can include a position identifier to indicate the position in a receive buffer in which to increment a counter. As such, the position identifier of a forward packet can indicate the position of the forward transmit buffer that was active when the forward packet was sent. Upon receiving the forward packet, a counter in the position indicated by the position identifier can be incremented in the forward receive buffer. Similarly, the position identifier of a reverse packet can indicate the position of the reverse transmit buffer that was active when the reverse packet was sent. Upon receiving the reverse packet, a counter in the position indicated by the position identifier can be incremented in the reverse receive buffer.

It is a yet further aspect of the embodiments that the forward and reverse packets can contain a traffic class indicator indicating a traffic class for the packet. Internet hardware can prioritize the delivery of packets based on the traffic class indicated by the packet. Each position in the circular buffers can have a counter for each of the traffic classes. As such, forward loss and reverse loss can be calculated for each of the traffic classes. When there are two traffic classes, a first traffic class and a second traffic class, the positions in the circular buffers can have a first traffic class counter and a second traffic class counter. The forward loss can be determined for each of the traffic classes and the reverse loss can be determined for each of the traffic classes.

It is still another aspect of the embodiments that the SD-WAN overlay path can be an IPSEC tunnel. Those practiced in the art of computer networking are familiar with IPSEC tunnels.

It is a further aspect of the embodiments that a computer readable medium storing computer readable instructions, that when executed on one or more processors, implements the method for in-line loss measurement on an SD-WAN overlay path.

Non-transitory computer readable media can store data and computer readable instructions. A computer readable medium storing computer readable instructions that can be executed on one or more processors may implement methods for in-line loss measurement on an SD-WAN overlay path.

BRIEF DESCRIPTION OF THE FIGURES

The embodiments herein will be better understood from the following detailed description with reference to the drawings, in which:

FIG. 10 illustrates calculating a delta between previous and current counter values, according to embodiments disclosed herein;

FIG. 11 illustrates calculating an absolute loss, according to embodiments disclosed herein;

FIG. 12 illustrates calculating a loss ratio, according to embodiments disclosed herein;

DETAILED DESCRIPTION OF EMBODIMENTS

Figure 1:
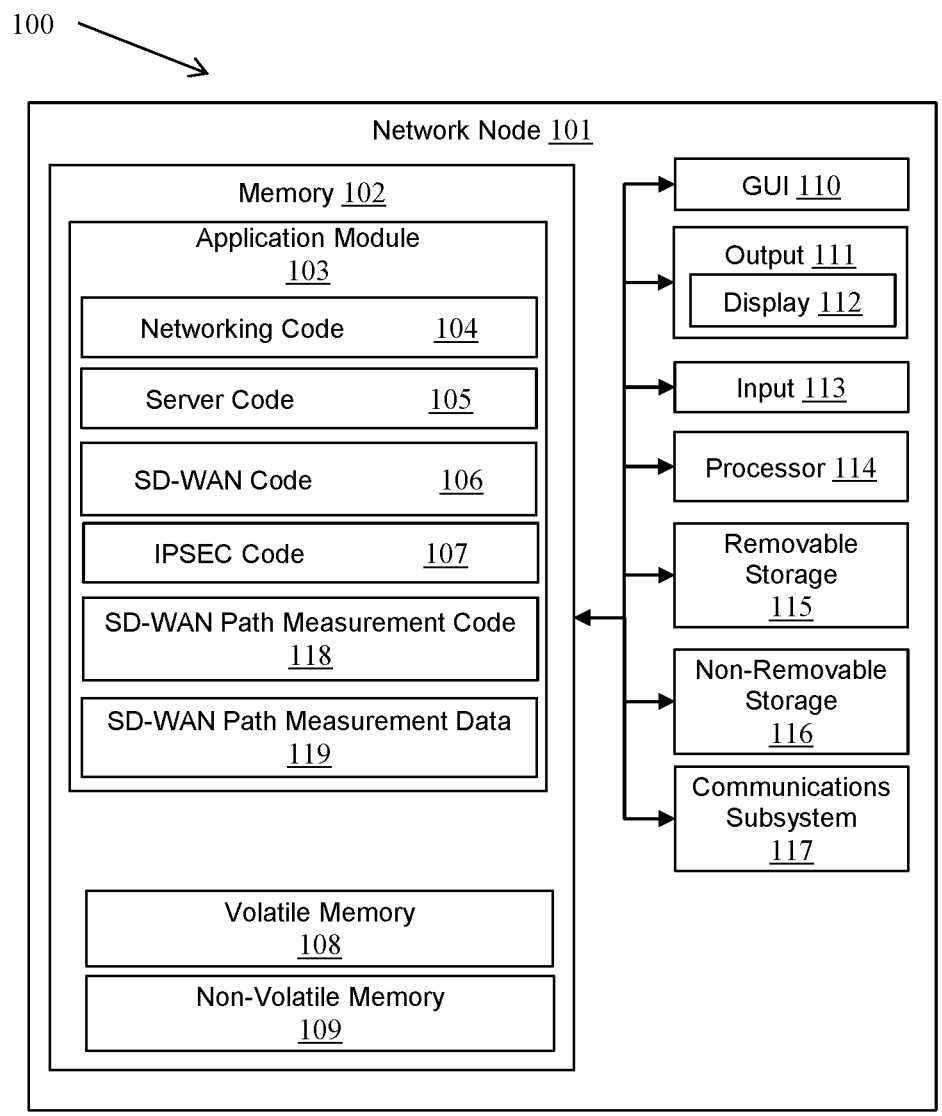
FIG. 1 is a high-level block diagram of a network node that can run a method for providing in-line measurement on SD-WAN overlay paths, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Previously, end to end loss measurement was done by periodically sending synthetic SLA PDUs (Service Level Agreement Packet Data Units) from one end and looping them back on the remote end to the sender. Loss measurement was done based on loss of synthetic SLA PDUs during the measurement interval. The loss could be measured even if there was no customer traffic. However, such measurements are not granular and may not be able to detect small losses reliably and quickly because they can only detect the dropping of the synthetic SLA PDUs.

The embodiments described herein can measure forward traffic loss and reverse traffic loss whereas the previous techniques measure round trip packet loss of the SLA PDUs. The embodiments' measurements use the customer's traffic and can detect a packet loss of less than 1%, which is a finer grain measurement than previously available.

To compute the end to end in-line loss, synthetic SLA measurement PDUs can carry traffic counters from the remote end back to the sender. The sender can compute the loss by measuring the difference of sent and received packet counters in the forward and reverse direction. These SLA measurement PDUs are similar to those described in the ITU Y1731 ETH-LM protocol. The previous techniques however, are inaccurate because they expect the network traffic to flow in-order and the counters to be updated by a single entity at sender and receiver end. The previous techniques require the SLA PDUs to go in with the data traffic and the counters to be copied on to the SLA PDU at the right time to prevent counters from going out of sync and giving wrong values.

In a typical network, the traffic flow can be received out of order due to re-routing and other factors. Also, software-based implementations can have out of order packets when network traffic is processed using multiple threads or cores. Furthermore, the SLA PDUs and data traffic may be processed by different threads which can lead to counters being not updated atomically.

The disclosed embodiments provide more reliable and finer grained measurements. Traffic counters such as packets sent and packets received can be maintained on local and remote ends of a SD-WAN overlay path. Since it is a point to point path at the SD-WAN level, packets sent on one end of the path should be received by the other end in a reasonable time unless there is a loss. A window scheme can be used by the sender and receiver to get accurate loss measurement per transport path between two SD-WAN endpoints. A window is defined as a block of time [t, t+u] where packets are sent from the transmitter and should be accounted for accurately at the receiver during this block of time. Here u is the size of the time interval, such as two seconds. Also of significance is the traffic class for which a given packet is sent. The intermediate nodes routing the packet through the internet can prioritize traffic depending on the distributed service code-point (DSCP) in the packet. The DSCP maps to a given traffic-class during packet classification in the ingress. Corresponding rewrite is done on the egress.

FIG. 1 is a high-level block diagram 100 of a network node 101 that can run a method for providing in-line measurement on SD-WAN overlay paths, according to embodiments disclosed herein. A computing device in the form of a computer 101 configured to interface with controllers, peripheral devices, and other elements disclosed herein may include one or more processing units 114, memory 102, removable storage 115, and non-removable storage 116. Memory 102 may include volatile memory 108 and non-volatile memory 109. Network node 101 may include or have access to a computing environment that includes a variety of transitory and non-transitory computer-readable media such as volatile memory 108 and non-volatile memory 109, removable storage 115 and non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Network node 101 may include, or have access to, a computing environment that includes input 113, output 111, and a communications subsystem 117. The network node 101 may operate in a networked environment using a communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 111 is most commonly provided as a computer monitor, but may include any output device. Output 111 and/or input 113 may include a data collection apparatus associated with network node 101. In addition, input 113, which commonly includes a computer keyboard and/or pointing device such as a computer mouse, computer track pad, touch screen, or the like, allows a user to select and instruct network node 101. A user interface can be provided using output 111 and input 113. Output 111 may include a display 112 for displaying data and information for a user, or for interactively displaying a GUI (graphical user interface) 110. A GUI is typically responsive of user inputs entered through input 113 and typically displays images and data on display 112.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in application module 103, can include or be representative of software routines, software subroutines, software objects, etc. described herein, are stored on a computer-readable medium and are executable by the processor device (also called a processing unit) 114 of network node 101. The application module 103 can include computer code such as networking code 104, server code 105, SD-WAN code 106, IPSEC code 107, SD-WAN path measurement code 118, and SD-WAN path measurement data 119. A hard drive, CD-ROM, RAM, Flash Memory, and a USB drive are just some examples of articles including a computer-readable medium.

Figure 2:
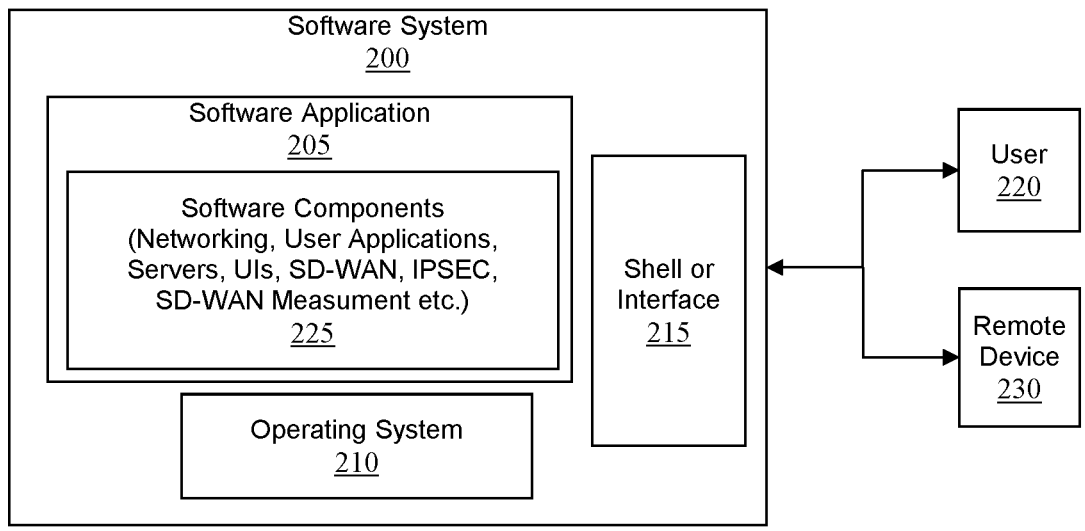
FIG. 2 is a high-level block diagram of a software system, according to embodiments disclosed herein.

FIG. 2 is a high-level block diagram of a software system 200, according to embodiments herein. FIG. 2 illustrates a software system 200, which may be employed for directing the operation of the data-processing systems such as network node 101. Software applications 325, may be stored in memory 102, on removable storage 115, or on non-removable storage 116, and generally includes and/or is associated with a kernel or operating system 210 and a shell or interface 215. One or more application programs may be "loaded" (i.e., transferred from removable storage 115 or non-removable storage 116 into the memory 102) for execution by the network node 101. An application program 205 can include software components 225 such as software modules, software subroutines, software objects, network code, user application code, server code, UI code, SD-WAN code, IPSEC code, SD-WAN measurement code, etc. The software system 200 can have multiple software applications each containing software components. The network node 101 can receive user commands and data through interface 215, which can include input 113, output 111, and communications connection 117 accessible by a user 220 or remote device 230. These inputs may then be acted upon by the network node 101 in accordance with instructions from operating system 210 and/or software application 205 and any software components 225 thereof.

Generally, software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, operating system 210 and GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data-processing system such as network node 101, in conjunction with program code in an application module 103 in memory 102, software system 200, or network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3:
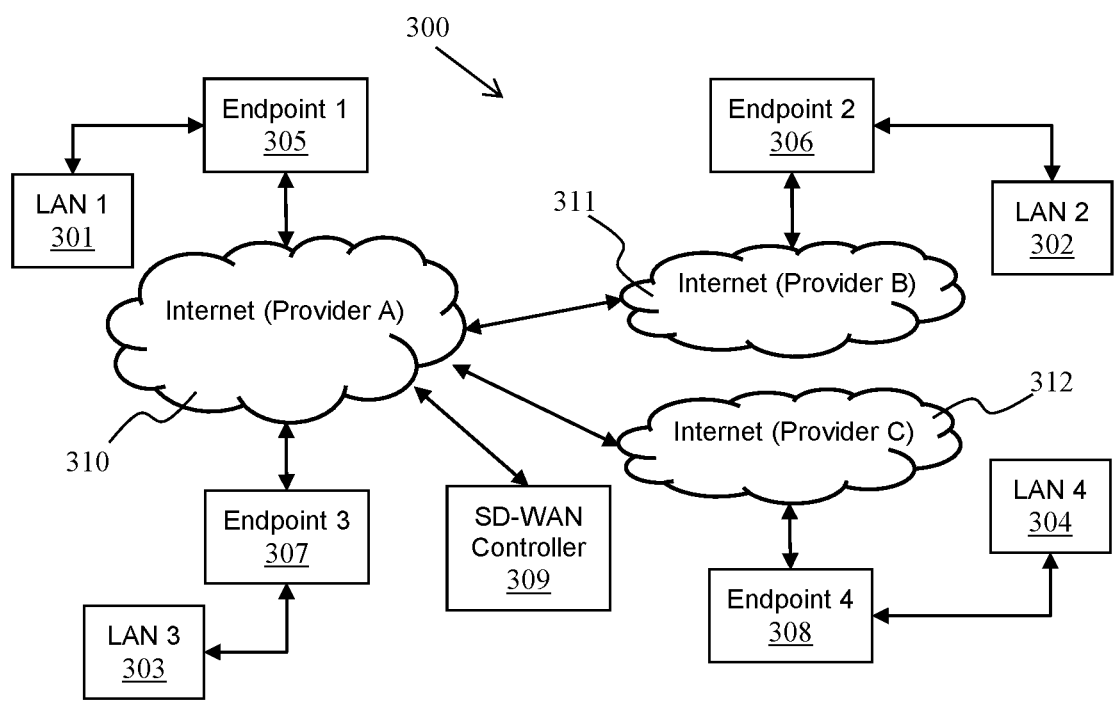
FIG. 3 is a high-level block diagram of a WAN over which a SD-WAN can be overlaid, according to embodiments disclosed herein.

FIG. 3 is a high-level block diagram of a WAN 300 over which a SD-WAN 400 can be overlaid, according to embodiments disclosed herein. Endpoint 1 305 connects LAN 1 301 to the internet through a connection to internet provider A 310. Endpoint 2 306 connects LAN 2 302 to the internet through a connection to internet provider B 311. Endpoint 3 307 connects LAN 3 303 to the internet through a connection to internet provider A 310. Endpoint 4 308 connects LAN 4 304 to the internet through a connection to internet provider C 312. SD-WAN controller 309 is illustrated as connecting to the internet through internet provider A 310 although in practice the only requirement is that the endpoints 305-308 can communicate with the SD-WAN controller 309 before the SD-WAN 400 is established. The endpoints 305-308 and the SD-WAN controller 309 are responsible for establishing the SD-WAN 400 that overlays the WAN 300.

Figure 4:
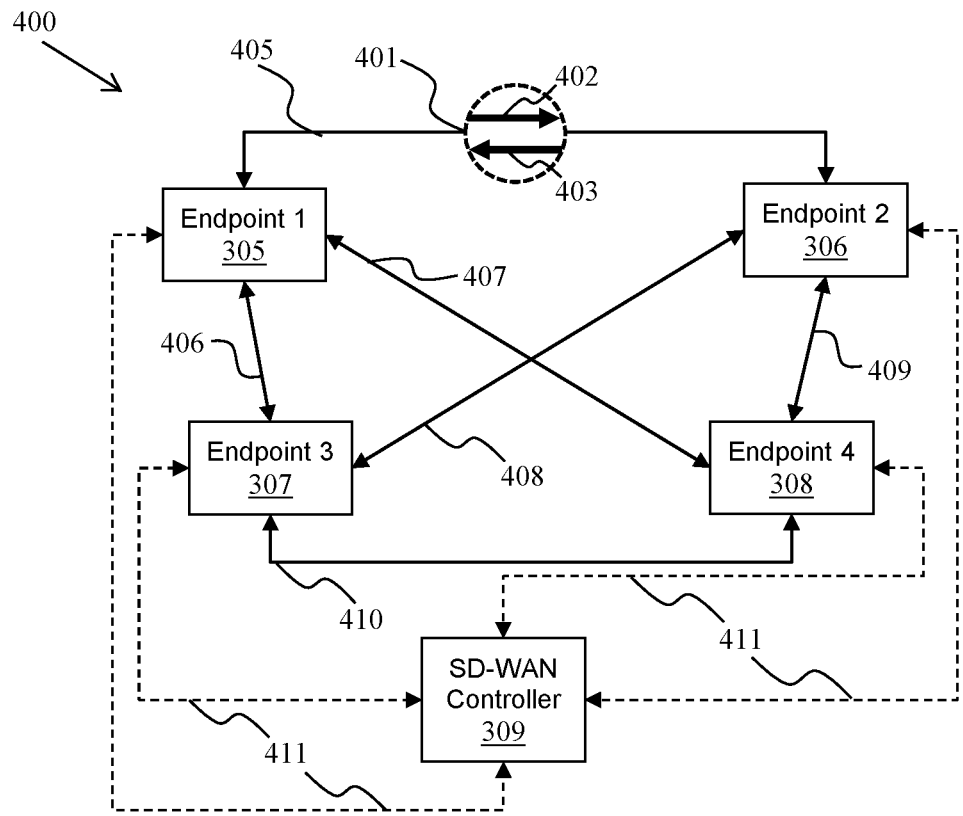
FIG. 4 depicts an SD-WAN that can be overlaid over the WAN of FIG. 3, according to embodiments disclosed herein.

FIG. 4 depicts an SD-WAN 400 that can be overlaid over the WAN 300 of FIG. 3, according to embodiments disclosed herein. The SD-WAN controller 309 can communicate with the endpoints 305-308 over links 411. The SD-WAN controller 309 and the links 411 can be considered to be part of the control plane of the SD-WAN 400. The data plane of the SD-WAN 400 includes six SD-WAN overlay paths 405-410. The SD-WAN 400 of FIG. 4 is a fully connected mesh because every endpoint is directly connected to every other endpoint by one of the SD-WAN overlay paths. Bubble 401 shows forward network traffic 402 and reverse network traffic 403 on a SD-WAN overlay path 405.

The SD-WAN controller 309 can act as an intermediary helping establish secure connections between the endpoints 305-308 by providing for key exchange, authentication, discovery, and other services. For example, in the WAN 300 of FIG. 3 the SD-WAN controller 309 may be the only network node having a known address. In such a scenario, the endpoints are unable to directly contact each other until they learn one another's addresses. The endpoints should not trust that any other system is another endpoint before key exchange and authentication using a trusted intermediary. SD-WAN controller 309 can be that intermediary. Endpoint 1 305 can contact SD-WAN controller 309 and perform key exchange and authentication handshakes to thereby establish encrypted communications with the SD-WAN controller 309. The other endpoints 306-308 can perform the similar handshakes to establish encrypted communications with the SD-WAN controller 309. The endpoints can then establish direct encrypted communications with one another with the help of the SD-WAN controller. Those familiar with tunneling protocols and IPSEC (a notoriously well-known IP Security Protocol suite) are familiar with key exchanges, authorization, and other aspects of establishing secure and encrypted communications between network nodes such as the endpoints 305-308 and SD-WAN controller 309. Those familiar with SD-WANs are familiar with overlaying an SD-WAN 400 on a WAN 300.

Figure 5:
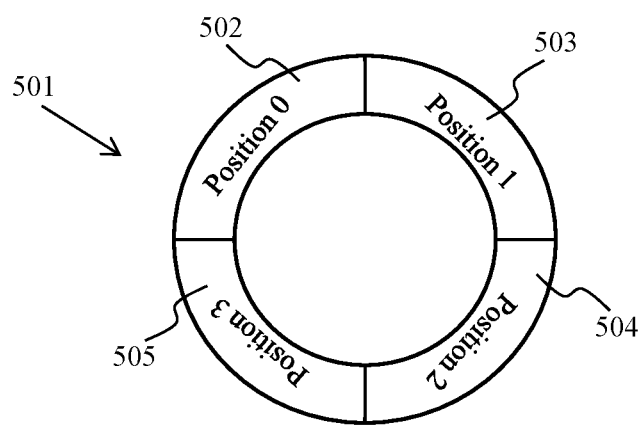
FIG. 5 depicts a high-level conceptual view of a circular buffer with four positions, according to embodiments disclosed herein.

FIG. 5 depicts a high-level conceptual view of a circular buffer 501 with four positions, according to embodiments disclosed herein. The four positions are position 0 502, position 1 503, position 2 504, and position 3 505. Circular buffers can be used to store data at each position with the buffer wrapping around to its beginning instead of overflowing or growing beyond its original size, as is typical of other data structures. Here, each position in a circular buffer has at least one counter.

Figure 6:
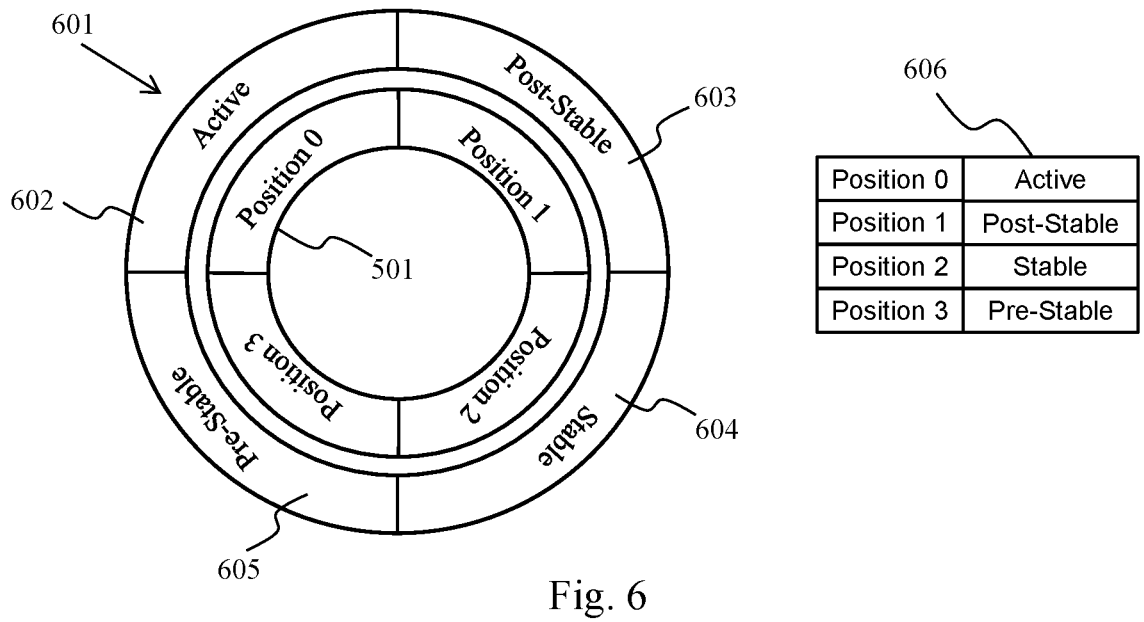
FIG. 6 depicts a high-level conceptual view of a circular buffer with positions having roles that can rotate, according to embodiments disclosed herein.

FIG. 6 depicts a high-level conceptual view of a circular buffer 501 with positions 502-505 having roles 601 that can rotate, according to embodiments disclosed herein. The roles are active 602, pre-stable 603, stable 604, and post-stable 605. In FIG. 6, position 0 502 has the active role 602. More succinctly, position 0 of the buffer 501 is active. As can be seen from the alignment of the roles 601 and the circular buffer 501 in FIG. 6, position 1 503 is pre-stable 603, position 2 504 is stable 604, and position 3 505 is post-stable 605. Table 606 also shows roles for the positions.

Figure 7:
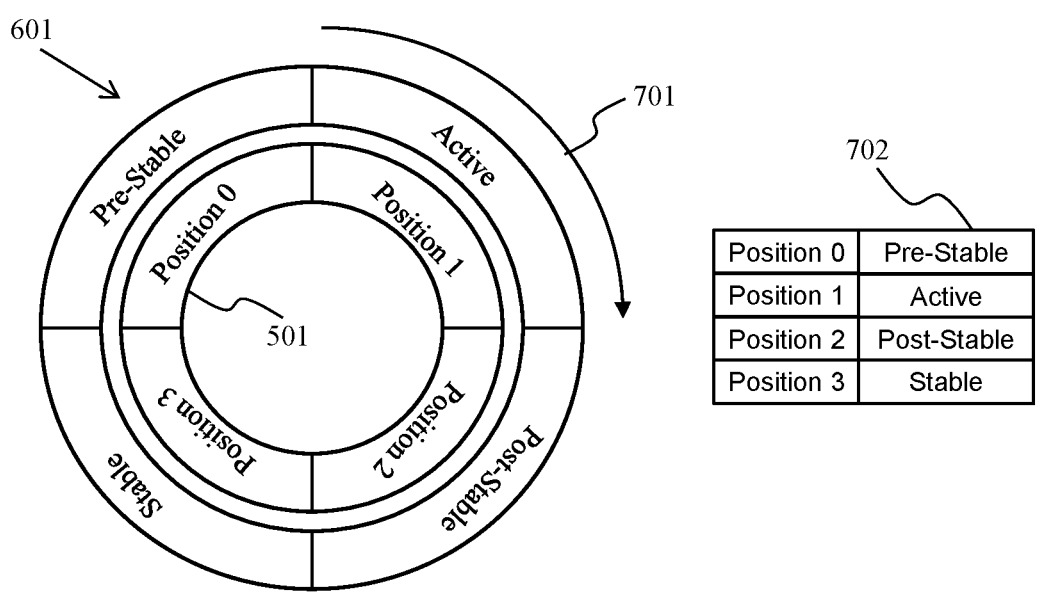
FIG. 7 depicts the circular buffer of FIG. 6 with the roles rotated, according to embodiments disclosed herein.

FIG. 7 depicts the circular buffer of FIG. 6 with the roles 601 rotated 701, according to embodiments disclosed herein. The roles are shown rotated by one position. As can be seen from the alignment of the roles 601 and the circular buffer 501 in FIG. 7, the roles for the positions have changed. Position 0 502 is pre-stable 605, Position 1 503 is active 602, position 2 504 is post-stable 603, and position 3 505 is stable 604. Table 702 also shows roles for the positions.

The period for rotation of the roles to new positions should be large enough that only severely delayed packets would have a position identifier indicating the position that is stable. Here the rotation period is not the time taken from a full 360-degree rotation but is instead the amount of time from a position becoming active to the position becoming pre-stable. Based on network delays that are currently commonly observed between remote well-connected branches, rotating roles every two seconds works well because packets are rarely delayed by more than two seconds. Note that this presumes a circular buffer with only one pre-stable position. Positions are pre-stable after being active and before being stable. The time delay from exiting the active role to entering the stable role is the rotation period times the number of pre-stable positions. Practice has also indicated a range of times for rotating roles. Internet connections for businesses are often contracted with service level agreements (SLAs). Based on the SLAs, a specified percentage of packets are expected to be delivered with less than a specified delay. High speed connections can, for example, operate with SLA's specifying that 99.9% of packets are delivered within one second. Poor connections, such as those passing through oceans or to remote locations, can have far more delay and jitter such the 99% of packets being delivered within ten seconds. It is the delay from a position being active to being stable that allows for counting received packets before the position is stable. This delay provides an advantage over previous techniques by providing a window of time during which the counters can stabilize and while every forward or reverse packet can be counted instead of just SLA-PDUs.

The embodiments described herein can use the circular buffers to count transmitted and received packets during defined time periods. For ease of discussion and without limiting the embodiments, the circular buffers can be rotated every two seconds. Here, rotated means moved by one position with the role of the last position being moved to the first position. Returning to FIGS. 6 and 7, the roles of the positions in FIG. 6 have been rotated to the roles of the positions in FIG. 7. The buffers being circular buffers, the role (post-stable) of the last position (position 3) rotates to the first position (position 0). The roles can rotate periodically. For example, the roles can rotate every two seconds such that position 0 is active during the time range [t, t+2], position 0 is pre-stable during the time range [t+2, t+4], position 0 is stable during the time range [t+4, t+6], position 0 is post-stable during the time range [t+6, t+8], and position 0 is active again during the time range [t+8, t+10], Each SD-LAN overlay path has a forward network traffic carrying forward packets and has reverse network traffic carrying reverse packets. There can be two circular buffers for the forward network traffic, a forward transmit buffer, and a forward receive buffer. In general, the first endpoint, which transmits the forward packets, keeps and manages the forward transmit buffer. Similarly, the second endpoint, which receives the forward packets, keeps and maintains the forward receive buffer. For the simplicity of this non-limiting description there are two traffic classes, traffic class 1 and traffic class 2, such that each position of a circular buffer has a counter for traffic class 1 and a counter for traffic class 2. Applying the example above to the forward transmit buffer and the forward receive buffer, both have position 0 active during the time range [t, t+2]. As such, the traffic class 1 counter in position 0 of the forward transmit buffer can be incremented by the first endpoint for each traffic class 1 forward packet it sends during the time period [t, t+2]. The packets can include data indicating the traffic class and the position that was active when the packet was sent. As such, a traffic class 1 forward packet sent by the first endpoint during the time period [t, t+2] would indicate traffic class 1 and position 0. The traffic class 1 counter in position 0 of the forward receive buffer can be incremented by the second endpoint for each forward packet it receives indicating traffic class 1 and position 0. At time t+4, position 0 transitions to stable and it can be assumed no position 0 packets will be received while position 0 is stable or post stable, which is the time range [t+4, t+8]. It is an implementation detail whether a stable or post-stable counter can be incremented or cannot be incremented. It is important to note that the traffic class and the time at which a packet is transmitted determines which counter in the forward transmit buffer is incremented while it is the packets contents that determine which counter in the forward receive buffer is incremented.

The example above discussed the counting of traffic class 1 forward packets sent while position 0 was active. Packets for other traffic classes can be similarly counted by incrementing the counters for those traffic classes. Packets transmitted when other positions are active can be counted by incrementing counters for those other positions. Reverse packets can be counted using different circular buffers, a reverse transmit buffer and a reverse receive buffer, in the same manner as forward packets are counted.

Figure 8:
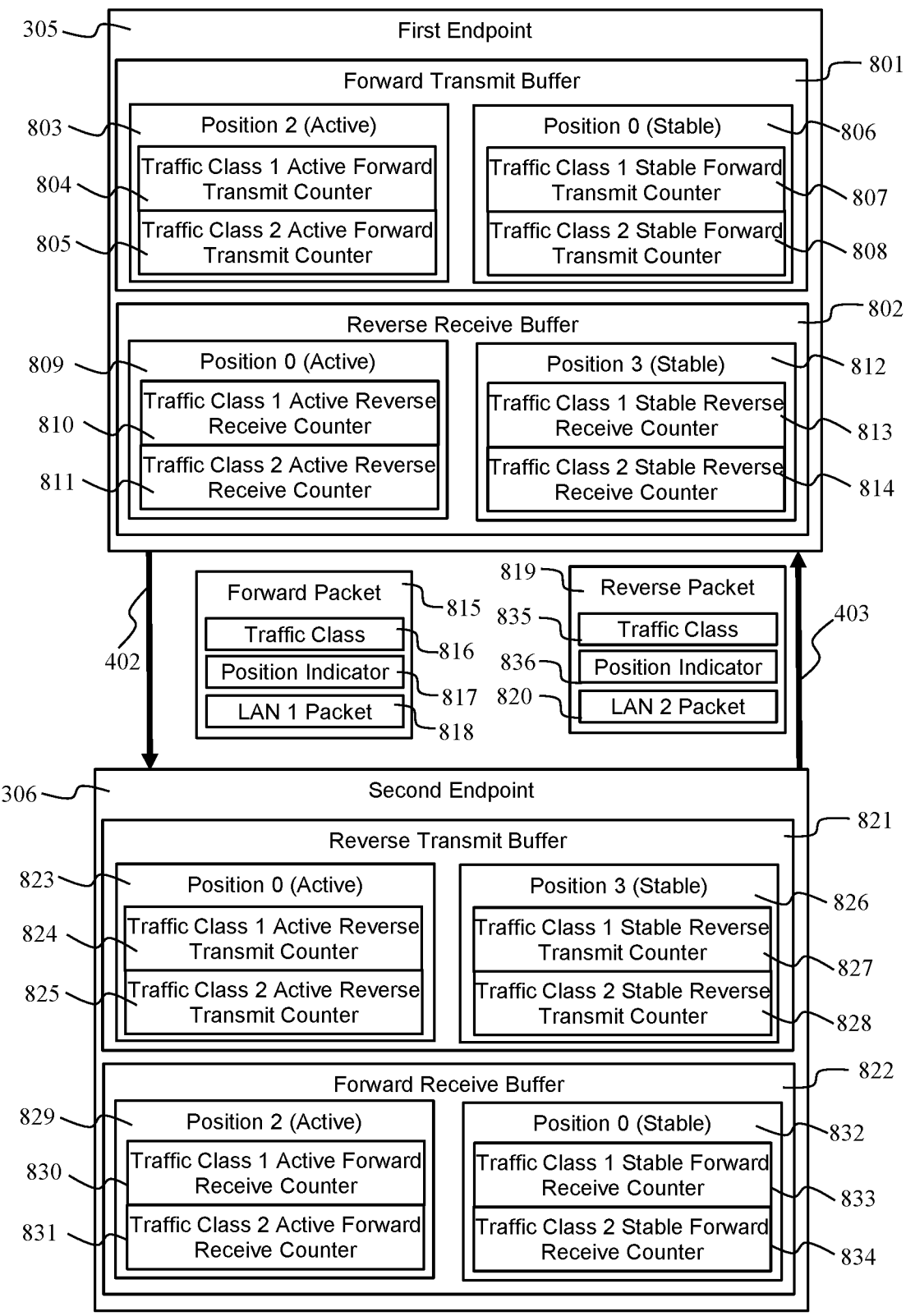
FIG. 8 is a high-level block diagram of two endpoints connected by a SD-WAN overlay path, according to embodiments disclosed herein.

FIG. 8 is a high-level block diagram of two endpoints connected by a SD-WAN overlay path, according to embodiments disclosed herein. The first endpoint 305 sends forward traffic 402 to the second endpoint 306. The second endpoint 306 sends reverse traffic 403 to the first endpoint 305. The forward traffic 402 consists of forward packets 815. The reverse traffic 403 consists of reverse packets 819. The first endpoint 305 has a forward transmit buffer 801 and a reverse receive buffer 802. Counters in the forward transmit buffer 801 can count forward packets 815 sent by the first endpoint 305. Counters in the reverse receive buffer 802 can count reverse packets 819 received by the first endpoint. The second endpoint 306 has a reverse transmit buffer 821 and a forward receive buffer 822. Counters in the reverse transmit buffer 821 can count reverse packets 819 sent by the second endpoint. Counters in the forward receive buffer 822 can count forward packets 815 received by the second endpoint.

FIG. 8 shows that position 2 803 is active for the forward traffic 402. Position 2 being active, the position indicator 817 of the forward packet 815 indicates position 2. The traffic class indicator 816 of the forward packet 815 indicates the forward packet's traffic class. If the forward packet 815 is traffic class 1, the traffic class 1 active forward transmit counter 804 would be incremented upon transmitting the forward packet 815. Position 2 being active, the traffic class 1 active forward transmit counter 804 is the class 1 counter in position 2 of the forward transmit buffer. If the forward packet 815 is traffic class 2, the traffic class 2 active forward transmit counter 805 would be incremented upon transmitting the forward packet 815. Position 2 being active, the traffic class 2 active forward transmit counter 805 is the class 2 counter in position 2 of the forward transmit buffer.

If the second end point 306 receives the forward packet 815, it would increment a counter based on the position indicator 817 and the traffic class indicator 816. As discussed above, the position indicator indicates position 2 was active when the packet was sent. If the forward packet is a traffic class 1 packet then the class 1 counter in position 2 of the forward receive buffer 822 is incremented. While position 2 is active for forward packets, that counter is the traffic class 1 active forward receive counter 830. While position 2 is active and if the forward packet is a traffic class 2 packet then the traffic class 2 active forward receive counter 831 would be incremented.

FIG. 8 shows that position 0 823 is active for the reverse traffic 403. Position 0 being active, the position indicator 836 of the reverse packet 819 indicates position 0. The traffic class indicator 835 of the reverse packet 819 indicates the reverse packet's traffic class. If the reverse packet 819 is traffic class 1, the traffic class 1 active reverse transmit counter 824 would be incremented upon transmitting the reverse packet 819. Position 0 being active, the traffic class 1 active reverse transmit counter 824 is the class 1 counter in position 0 of the reverse transmit buffer 821. If the reverse packet 819 is traffic class 2, the traffic class 2 active reverse transmit counter 825 would be incremented upon transmitting the reverse packet 819. Position 0 being active, the traffic class 2 active reverse transmit counter 825 is the class 2 counter in position 0 of the reverse transmit buffer.

If the first end point 305 receives the reverse packet 819, it would increment a counter based on the position indicator 836 and the traffic class indicator 835. As discussed above, the position indicator 836 indicates position 0 was active when the reverse packet 819 was sent. If the reverse packet is a traffic class 1 packet then the class 1 counter in position 0 of the reverse receive buffer 802 is incremented. While position 0 is active for reverse packets, that counter is the traffic class 1 active reverse receive counter 810. If the forward packet is a traffic class 2 packet then the traffic class 2 active reverse receive counter 811 would be incremented.

Stable data is needed for calculating loss factors. In FIG. 8, position 0 806, 832 is stable for forward traffic and position 3 812, 826 is stable for reverse traffic. Note that the pre-stable and post-stable positions are omitted from the figure for clarity. In the following example, the loss factor is the absolute loss which is the difference between packets sent and packets received. The class 1 forward loss is the difference between the traffic class 1 stable forward transmit counter 807 and the traffic class 1 stable forward receive counter 833. The class 2 forward loss is the difference between the traffic class 2 stable forward transmit counter 808 and the traffic class 2 stable forward receive counter 834. The class 1 reverse loss is the difference between the traffic class 1 stable reverse transmit counter 827 and the traffic class 1 stable reverse receive counter 813. The class 2 reverse loss is the difference between the traffic class 2 stable reverse transmit counter 828 and the traffic class 2 stable reverse receive counter 814.

The circular buffer positions that are active and stable in FIG. 8 will transition to other roles when the roles rotate. For example, when the active role for forward packets rotates to position 3, the traffic class 1 active forward transmit counter will become the class 1 counter in position 3 of the forward transmit buffer.

The circular buffers are shown having four positions. Circular buffers with more positions can be used. The forward traffic transmit and receive buffers should have the same number of positions and only one active position at any time. The reverse traffic transmit and receive buffers should have the same number of positions and only one active position at any time. Otherwise, the principal of rotating roles to different positions remain unchanged.

The forward packet 815 is illustrated as encapsulating a first LAN packet 818. The reverse packet 819 is illustrated as encapsulating a second LAN packet 820. The second endpoint can unpack a plurality of first LAN packets from a plurality of forward packets. The first endpoint can unpack a plurality of second LAN packets from a plurality of reverse packets. After unpacking, the first LAN packets and the second LAN packets can then be passed into the LANs behind the endpoints. In this manner, a first LAN packet 818 can be routed onto the second LAN 302 and a second LAN packet 820 can be routed onto the first LAN 301.

Figure 9:
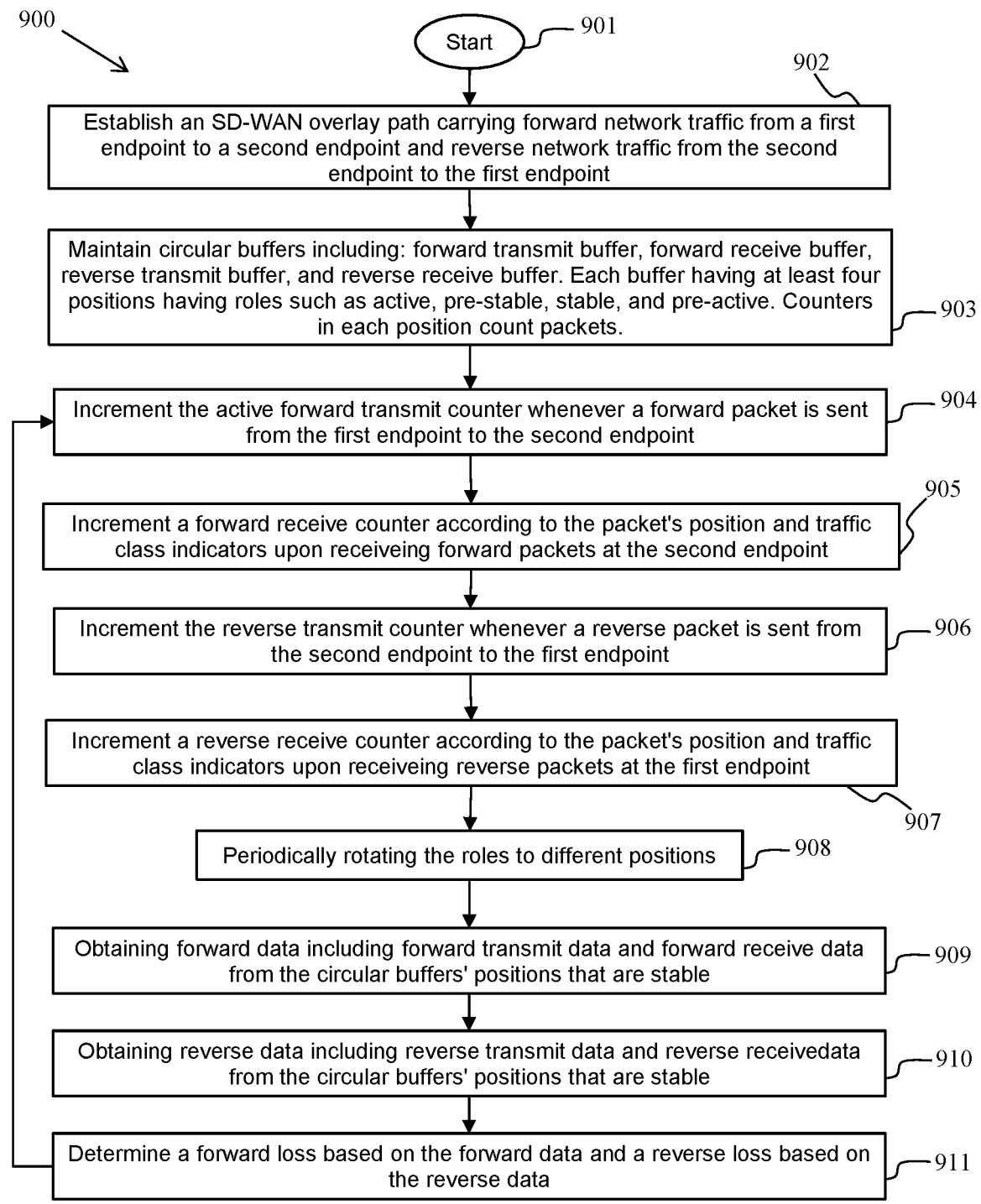
FIG. 9 is a flow chart illustrating a method for providing in-line measurement on SD-WAN overlay paths, according to embodiments disclosed herein.

FIG. 9 is a flow chart illustrating a method for providing in-line measurement on SD-WAN overlay paths 900, according to embodiments disclosed herein. After the start 901, an SD-WAN overlay path can be established 902. The SD-WAN overlay path can carry forward network traffic from a first endpoint to a second end point and can carry and reverse network traffic from the second endpoint to the first end point. Circular buffers can be maintained 903. The circular buffer can include a forward transmit buffer, a forward receive buffer, a reverse transmit buffer, and a reverse receive buffer. Each buffer can have at least four positions and the positions can have roles such as active, pre-stable, stable, and pre-active. Counters in each position can count packets. An active forward transmit counter can be incremented whenever a forward packet is sent from the first endpoint to the second endpoint 904. The specific counter depends on the traffic class of the packet and the position of the forward traffic circular buffers that is active when the forward packet is transmitted. A forward receive counter can be incremented whenever a forward packet is received by the second endpoint 905. The specific counter for a particular forward packet depends on the traffic class indicator and the position indicator within the forward packet.

An active reverse transmit counter can be incremented whenever a reverse packet is sent from the second endpoint to the first endpoint 906. The specific counter depends on the traffic class of the packet and the position of the reverse traffic circular buffers that is active when the reverse packet is transmitted. A reverse receive counter can be incremented whenever a reverse packet is received by the first endpoint 907. The specific counter for a particular reverse packet depends on the traffic class indicator and the position indicator within the reverse packet. The roles can be periodically rotated to different positions 908. Forward data can be obtained 909. The forward data can include forward transmit data and forward receive data from the forward traffic circular buffers' positions that are stable. Reverse data can be obtained 910. The reverse data can include reverse transmit data and reverse receive data from the reverse traffic circular buffers' positions that are stable. Forward losses and reverse losses can be determined 911. The forward and reverse losses can be calculated for each traffic class and for all traffic classes. The forward losses can be calculated from the forward data. The reverse losses can be calculated from the reverse data.

The process of FIG. 9 is illustrated as looping back to step 904 because it can be a continuous process generating an additional set of packet loss statistics every time the roles rotate and an additional set of stable counters become available in the stable positions of the circular buffers. For example, if the roles rotate every two seconds then a stream of packet loss data is generated with new data points every two seconds. The packet loss data can be provided to a network administrator or other person as raw numbers or a graph. The packet loss data can be used to ensure that ISPs honor service level agreements.

FIG. 10 illustrates calculating a delta between previous and current counter values, according to embodiments disclosed herein. Upon transitioning to active, a position's counters can be reset to zero so that counting begins anew. Alternatively, the counters can be allowed to retain their previous values. In such a case, the counters would provide a running total of all packets transmitted or received for each traffic class and position. In such a case, additional calculations are required to determine the number of packets transmitted during a particular active interval and the number of those packets received. For example, using the 4-position circular buffer and rotating roles every 2 seconds, position 2 could be active for the time interval [1492, 1494]. Once position 2 becomes stable (at t=1496), the counter values could show a total of 314159265 packets transmitted and 311017672 packets received during all of those time intervals when position 2 was active. The next time interval during which position 2 is active could be [1500, 1502]. Again, waiting for position 2 to become stable, the new totals could show 314160265 packets transmitted and 311018662 packets received. The delta of the transmitted packets is the current counter value (314160265) minus the previous counter value (314159265)=1000. Here, the delta indicates the number of packets transmitted during the time period [1500, 1502]. A similar calculation (311018662–311017672=990) indicates that 990 of those 1000 packets were received.

FIG. 11 illustrates calculating an absolute loss, according to embodiments disclosed herein. The absolute loss is the number of packets transmitted minus the number received. Returning to the example above, 1000−990=10. 10 of the 1000 transmitted packets were lost.

FIG. 12 illustrates calculating a loss ratio, according to embodiments disclosed herein. The loss ratio can be the percentage of packets lost, calculated as the number lost divided by the number transmitted times 100. Returning to the example above 10/1000*100 reveals that 1% of the packets transmitted during the period [1500,1502] were lost. FIGS. 11-12 show calculations for traffic in the forward direction. The traffic statistics for reverse traffic can be calculated in a similar manner (replace "forward" with "reverse" in FIGS. 11-12).

Figures 13, 14:
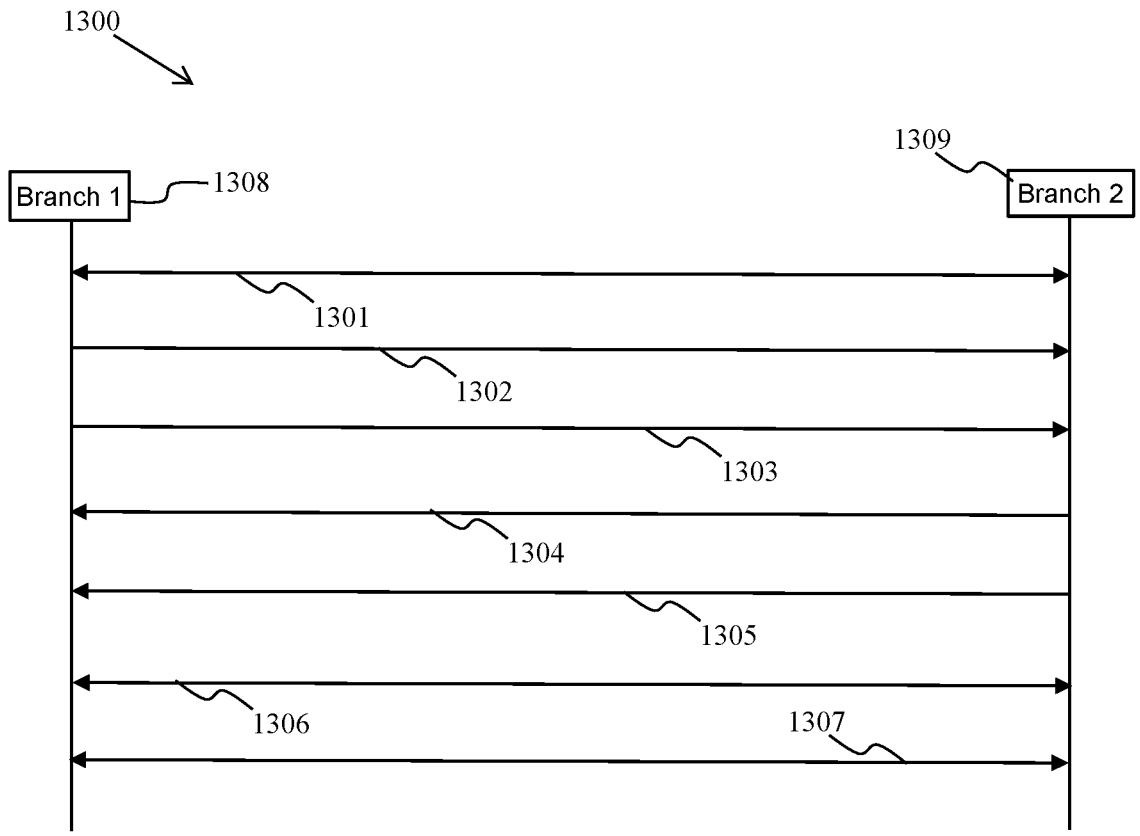
FIG. 13 illustrates an attribute exchange sequence, according to embodiments disclosed herein.
FIG. 14 illustrates an SLA-PDU, according to embodiments disclosed herein.

FIG. 13 illustrates an attribute exchange sequence 1300, according to embodiments disclosed herein. An IPSEC tunnel is established between two SD-WAN endpoints 1301, illustrated as branch 1 1308 and branch 2 1309. In the direction from branch 1 1308 to branch 2 1309, service level agreement (SLA) monitoring is established per underlay path 1302 and an average round trip time (RTT), $RTT_{B1}$, can be calculated for N iterations of SLA-PDUs 1303. In the direction from branch 2 1309 to branch 1 1308, service level agreement (SLA) monitoring is established per underlay path 1304 and an average RTT, $RTT_{B2}$, can be calculated for N iterations of SLA-PDUs 1305. The endpoints 1308, 1309 can exchange average RTT times 1306 such that each knows $RTT_{B1}$ and $RTT_{B2}$. An interval, $t_{win}$, can be determined as the larger of $RTT_{B1}$ and $RTT_{B2}$, $t_{win}=\max(RTT_{B1}, RTT_{B2})$ 1307. $t_{win}$ can be the amount of time between rotating the roles to their next positions.

FIG. 14 illustrates an SLA-PDU 1400, according to embodiments disclosed herein. The illustrated SLA-PDU (service level agreement–protocol data unit) conforms to the specification of ITU Y.1731 and can carry data for measuring in-line loss. The data can include TX timestamp forward 1401, RX timestamp forward 1402, TX timestamp reverse 1403, RX timestamp reverse 1404, TX frames forward 1405, RX frames forward 1406, TX frames reverse 1407, and RX frames reverse 1408. "TX" is short for transmitted while "RX" is short for received.

Figure 15:
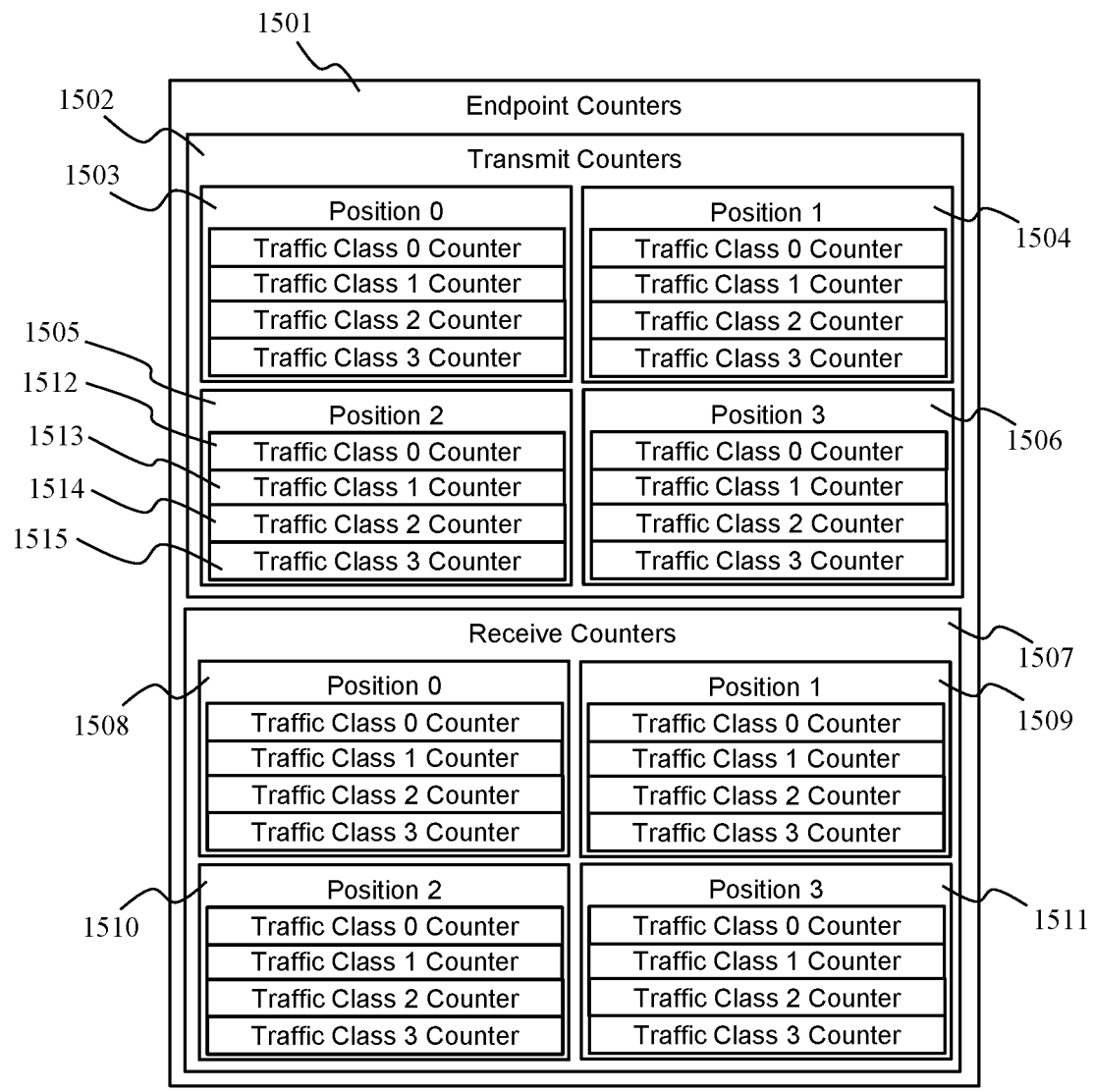
FIG. 15 illustrates endpoint counters, according to embodiments disclosed herein.

FIG. 15 illustrates an endpoint's endpoint counters 1501, according to embodiments disclosed herein. FIG. 8 showed a first endpoint 305 and a second endpoint 306 with some of their counters. FIG. 15 provides a more comprehensive example of the counters that an SD-WAN endpoint receiving and sending packets can have. The endpoint counters 1501 include transmit counters 1502 for counting frames (packets) that are sent and include receive counters 1507 for counting packets that are received. For a circular buffer having four positions, the transmit counters 1502 include counters for position 0 1503, position 1 1504, position 2 1505, and position 3 1506. Similarly, the receive counters 1507 include counters for position 0 1508, position 1 1509, position 2 1510, and position 3 1511. Each position is illustrated as having a counter for each of four traffic classes including traffic class 1 1512, traffic class 2 1513, traffic class 3 1514, and traffic class 4 1515. Network control can use traffic class 0, thereby including control packets. Expedited forwarding can use traffic class 1, thereby including packets that are to be forwarded expeditiously such as voice traffic data packets. Assured forwarding can use traffic class 2, thereby including packets that are sure to be forwarded, which includes traffic having multiple queueing profiles for different types of data. Best effort delivery can use traffic class 3, thereby including packets that may be dropped after a best effort attempt at delivery is made. As such, traffic class 3 can include the types of non-critical data that are not assigned to another traffic class. Such data can include web traffic, file transfers, etc.

Traffic counters such as packets sent and packets received can be maintained on local and on remote ends of a path. Paths being point to point in the SD-WAN, packets sent on one end of the path should be received by the other end in a reasonable time unless there is a loss. Recall that a point to point SD-WAN path may traverse numerous intermediate nodes in a WAN over which the SD-WAN is overlaid. To get accurate loss measurement per transport path between two communication SD (software defined) endpoints, a window scheme can be used at the sender and receiver. A window is defined as block of time [t, t+$W_t$] where packets are sent from the transmitter and should be accounted for accurately at the receiver during this block of time. Here, t is the current time and $W_t$ is the negotiated time block during which the counters are gathered. Also of significance is the traffic class (TC) for which a given packet is sent as the intermediate nodes prioritize traffic depending on the DSCP (Differentiated Services Code Point) code-point in the packet. This DSCP code-point maps to a given traffic-class during packet classification in the ingress. Corresponding rewrite is done on the egress. A non-limiting example of an algorithm for maintaining and updating counters for accurately measuring loss is provided below.

Counters can be maintained per window (or circular buffer position) identified by a window identifier ($w_{id}$) on the end points and by traffic class, <$w_{id}$, TC>. Note that the minimum range of window identifiers to accurately measure traffic loss within an acceptable range (<1%) is 0<=$w_{id}$<=3 modulo 4. A higher range would allow for higher precision but that would also increase the need for bookkeeping, thereby increasing space complexity which in our case would be O((n-1)*$N_{tun}$*m*$w_{id\_}$max). Here n is the total number of branches in a deployed SD-WAN overlay network, so in the worst case of a full mesh network we peer with (n-1) branches, $N_{tun}$ (constant) is number of tunnels established per peer branch, m is number of transport paths (given the number of underlay networks), $w_{id\_}$max is number of configured time windows.

The sender can update the transmit window identifier every $W_t$ units. As an example, $W_t$=2 seconds with $w_{id}$'s rolling over as described above. Note that under modulo 4 arithmetic $w_{id}$=0 follows $w_{id}$=3. The $w_{id}$ can give the circular buffer position with $w_{id}$=0 indicating position 0, $w_{id}$=1 indicating position 1, etc. Every traffic packet sent from the sender to the receiver on the path can carry the current transmit window identifier and traffic class in the packet header. If only a subset of packets carries the window identifier and traffic class, then traffic data for only that subset of packets may be gathered.

The sender can update the counters in the positions identified by the current window id and traffic class for a given site pair and transport path. The receiver can update the receive packet counters in the position indexed by the window id received in the packet header. With $W_t$=2 and four positions ($w_{id\_}$max=4), this allows for a safe 6 second interval during which a packet can be received and safely accounted for on the receiver.

A block of counters for a given window (position) is assumed to be stable when sufficient time has elapsed given the expectation of when the Receive/Transmit (RX/TX) happens. After this sufficient time interval, the running counter (instantaneous counters) becomes stable. A measure of TX window stable time ($TX_{wst}$) and RX window stable time ($RX_{wst}$) can be $TX_{wst}$=$W_t$+ceil($W_t$/2) and $RX_{wst}$=2*$W_t$+ceil($W_t$/2).

Defining additional variables for use in this example algorithm, $TX_{wss}$ is transmitter window stable stats, $RX_{wss}$ is receiver window stable stats, $TX_{wcs}$ is transmitter current stats for this time window, $RX_{wcs}$ is the receiver current stats for this time window. $TX_{wtl\_i}$ is last timestamp when a packet was transmitted for window $w_i$. and $RX_{wtl\_i}$ is the last timestamp when a packet was received for window $w_i$.

$TX_{wss}$ can be updated as follows:
for 0 <=$w_i$<=$w_{id}$
  if not (($TX_{w\_id}$==$w_i$) or (($TX_{w\_id}$-1) mod 4==$w_i$))
    $TX_{wss}$=$TX_{wcs}$
  if (($TX_{w\_id}$==$w_i$) or (($TX_{w\_id}$-1) mod 4==$w_i$)) and (t-$TX_{wtl\_i}$)>$TX_{wst}$
    $TX_{wss}$=$TX_{wcs}$ $RX_{wss}$ can be updated similarly to TX except the $RX_{w\_id}$ is the requested window id which might be a previous TX window from the sender perspective. To account for delays/out-of-order reception of packets, stable stats are never accounted on the RX side for the current and previous windows as it could lead to spurious accounting. Also, a reason for having a minimum of four time windows (positions) can be to provide accurate accounting. In addition, the time block $W_t$ can be negotiated so as to account for latency and jitter in the underlay network.

$RX_{wss}$ can be updated as follows:
for 0<=$w_i$<=$w_{id}$
  if not (($RX_{w\_id}$==$w_i$) or (($RX_{w\_id}$-1) mod 4==$w_i$))
    $RX_{wss}$=$RX_{wcs}$
  if (($RX_{w\_id}$==$w_i$) or (($RX_{w\_id}$-1) mod 4==$w_i$)) and (t-$RX_{wtl}$)>$RX_{wst}$
    $RX_{wss}$=$RX_{wcs}$ Considering the example, when the sender is using the 3rd window (position 3), the 1st window (position 1) can be considered as stable for loss computation. The SLA synthetic PDU can carry the 1st window (position 1) stable transmit stats and ask the remote end point to copy the 1st window (position 1) stable receive stats into the SLA-PDU which is sent back to the sender. The sender then can compute the loss by taking the difference of the 2 stats.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
   establishing an SD-WAN overlay path, the SD-WAN overlay path carrying forward network traffic from a first endpoint to a second endpoint, the forward network traffic comprising a plurality of forward packets encapsulating a plurality of first LAN packets;
   maintaining a plurality of circular buffers comprising a forward transmit buffer, and a forward receive buffer, each of the plurality of circular buffers comprising at least four positions and a plurality of counters, the at least four positions having roles comprising active, pre-stable, stable, and pre-active;
   periodically rotating each of the roles to a different one of the at least four positions;
   incrementing an active forward transmit counter whenever one of the plurality of forward packets is sent from the first endpoint;
   incrementing an active forward receive counter whenever one of the plurality of forward packets is received by the second endpoint with a position indicator indicating the active forward receive counter;
   obtaining forward data comprising forward receive data and forward transmit data, the forward transmit data obtained from the one of the positions of the forward transmit buffer that is stable, the forward receive data obtained from the one of the positions of the forward receive buffer that is stable; and
   determining, based on the forward data, a forward loss of the SD-WAN overlay path.

2. The method of claim 1 wherein rotating the roles comprises transitioning the one of the positions that is post-stable to active, transitioning the one of the positions that is stable to post-stable, transitioning the one of the positions that is pre-stable to stable, and transitioning the one of the positions that is active to pre-stable.

3. The method of claim 1 the forward loss being a number of transmitted packets minus a number of received packets.

4. The method of claim 1 the forward loss being a ratio of packets lost to packets transmitted.

5. The method of claim 1 wherein each of the positions comprises a first traffic class counter and a second traffic class counter and wherein the forward loss is determined for a first traffic class and a second traffic class.

6. The method of claim 1 wherein the plurality of circular buffers is rotated at least once every 10 seconds and no more than once every second.

7. The method of claim 1 wherein a plurality of traffic class indicators and a plurality of position indicators in the plurality of forward packets indicate a traffic class and the one of the positions that was active when each of the plurality of forward packets were sent.

8. The method of claim 1, the active forward transmit counter being in the one of the positions of the forward transmit buffer that is active.

9. The method of claim 1 further comprising incrementing a counter in the one of the positions that is pre-stable whenever one of the plurality of forward packets is received by the second endpoint with the position indicator indicating the one of the positions that is pre-stable.

10. The method of claim 1 wherein the SD-WAN overlay path is an IPSEC tunnel.

11. A method comprising:
    maintaining a plurality of circular buffers comprising a forward transmit buffer, and a forward receive buffer, each of the plurality of circular buffers comprising at least four positions and a plurality of counters, the at least four positions having roles comprising active, pre-stable, stable, and pre-active;
    periodically rotating each of the roles to a different one of the at least four positions;
    incrementing an active forward transmit counter whenever one of a plurality of forward packets is sent from a first endpoint, an SD-WAN overlay path carrying the plurality of forward packets from the first endpoint to a second endpoint;
    incrementing a forward receive counter whenever one of the plurality of forward packets is received by the second endpoint; and
    determining, based on forward data, a forward loss on the SD-WAN overlay path, the forward data comprising forward transmit data obtained from the one of the positions of the forward transmit buffer that is stable and forward receive data obtained from the one of the positions of the forward receive buffer that is stable.

12. The method of claim 11 further comprising:
    incrementing an active reverse transmit counter whenever one of a plurality of reverse packets is sent from the second endpoint to the first endpoint, the SD-WAN overlay path carrying the plurality of reverse packets from the second endpoint to the first endpoint, the plurality of circular buffers further comprising a reverse transmit buffer;
    incrementing an active reverse receive counter whenever one of the plurality of reverse packets is received by the first endpoint, the plurality of circular buffers further comprising a reverse receive buffer; and determining, based on reverse data, a reverse loss on the SD-WAN overlay path, the reverse data comprising reverse transmit data obtained from the one of the positions of the reverse transmit buffer that is stable and reverse receive data obtained from the one of the positions of the reverse receive buffer that is stable.

13. The method of claim 12, the active forward transmit counter being in the one of the positions of the forward transmit buffer that is active, the active forward receive counter being in the one of the positions of the forward receive buffer that is active, the active reverse transmit counter being in the one of the positions of the reverse transmit buffer that is active, and the active reverse receive counter being in the one of the positions of the reverse receive buffer that is active.

14. The method of claim 13 wherein rotating the roles comprises transitioning the one of the positions that is post-stable to active, transitioning the one of the positions that is stable to post-stable, transitioning the one of the positions that is pre-stable to stable, and transitioning the one of the positions that is active to pre-stable.

15. The method of claim 14 further comprising:
   establishing the SD-WAN overlay path, the forward network traffic comprising the plurality of forward packets encapsulating a plurality of first LAN packets;
   obtaining at least a part of the forward data and the reverse data in response to a message sent to the second endpoint;
   determining a number of transmitted packets minus a number of received packets;
   determining a ratio of packets lost to packets transmitted; and
   providing the forward loss and the reverse loss to a network administrator;
   wherein each of the positions comprises a first traffic class counter and a second traffic class counter and wherein the forward loss is determined for a first traffic class and a second traffic class;
   wherein the roles are rotated at least once every 10 seconds and no more than once every second;
   wherein the plurality of forward packets and the plurality of reverse packets comprise data indicating a traffic class and a position; and
   wherein the SD-WAN overlay path is an IPSEC tunnel.

16. A non-transitory computer readable medium storing computer readable instructions, that when executed on one or more processors, implements a method comprising:
   maintaining a plurality of circular buffers comprising a forward transmit buffer, and a forward receive buffer, each of the plurality of circular buffers comprising at least four positions and a plurality of counters, the at least four positions having roles comprising active, pre-stable, stable, and pre-active;
   periodically rotating each of the roles to a different one of the at least four positions;
   incrementing an active forward transmit counter whenever one of a plurality of forward packets is sent from a first endpoint, an SD-WAN overlay path carrying the plurality of forward packets from the first endpoint to a second endpoint;
   incrementing a forward receive counter whenever one of the plurality of forward packets is received by the second endpoint; and
   determining, based on forward data, a forward loss on the SD-WAN overlay path, the forward data comprising forward transmit data obtained from the one of the positions of the forward transmit buffer that is stable and forward receive data obtained from the one of the positions of the forward receive buffer that is stable.

17. The non-transitory computer readable medium storing computer readable instructions of claim 16, the method comprising:
   incrementing an active reverse transmit counter whenever one of a plurality of reverse packets is sent from the second endpoint to the first endpoint, the SD-WAN overlay path carrying the plurality of reverse packets from the second endpoint to the first endpoint, the plurality of circular buffers further comprising a reverse transmit buffer;
   incrementing a reverse receive counter whenever one of the plurality of reverse packets is received by the first endpoint, the plurality of circular buffers further comprising a reverse receive buffer; and
   determining, based on reverse data, a reverse loss on the SD-WAN overlay path, the reverse data comprising reverse transmit data obtained from the one of the positions of the reverse transmit buffer that is stable and reverse receive data obtained from the one of the positions of the reverse receive buffer that is stable.

18. The non-transitory computer readable medium storing computer readable instructions of claim 16 wherein the SD-WAN overlay path is an IPSEC tunnel.

19. The non-transitory computer readable medium storing computer readable instructions of claim 16 wherein each position comprises a first traffic class counter and a second traffic class counter and wherein the forward loss is determined for each of a plurality of traffic classes, and wherein the plurality of forward packets comprise data indicating one of the plurality of traffic classes and one of the positions.

20. The non-transitory computer readable medium storing computer readable instructions of claim 16, the active forward transmit counter being in the one of the positions of the forward transmit buffer that is active, and the active forward receive counter being in the one of the positions of the forward receive buffer that is active.

* * * * *